Patented Feb. 22, 1927.

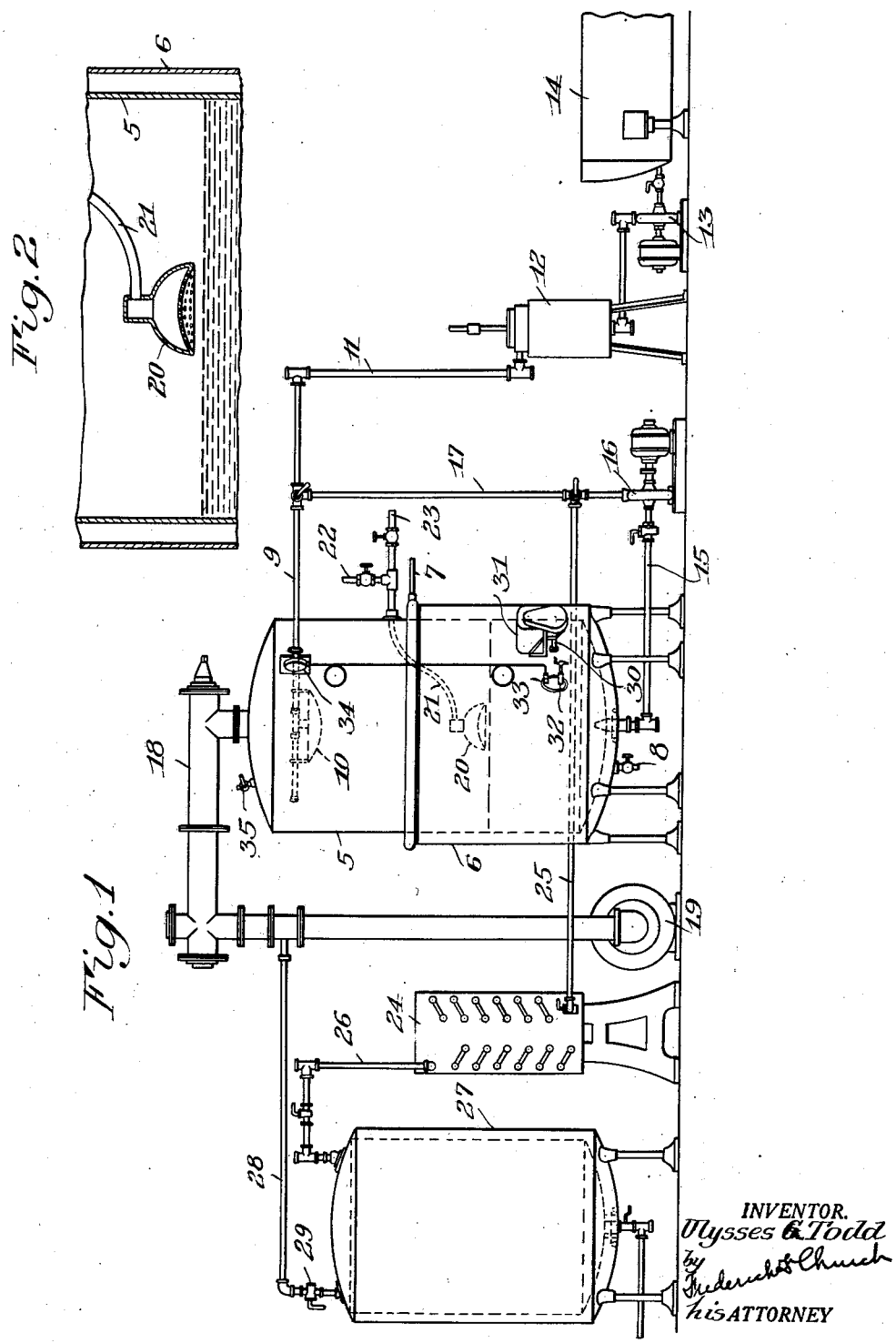

1,618,789

UNITED STATES PATENT OFFICE.

ULYSESS G. TODD, OF ROCHESTER, NEW YORK, ASSIGNOR TO PFAUDLER COMPANY, OF ROCHESTER, NEW YORK, A CORPORATION OF NEW YORK.

PROCESS FOR TREATING MILK PRODUCTS.

Application filed May 20, 1924. Serial No, 714,751.

This invention relates to processes and apparatus for removing undesirable odors and flavors such as onion, garlic and the like, from milk, cream and other liquids containing butter fat, the chief object of the invention being to provide an improved process and apparatus for accomplishing this purpose in an intensively rapid and thorough manner, for preparing such liquids for market, without injury to their physical properties.

To these and other ends the invention resides in certain improvements and combinations of parts all as will be hereinafter more fully described, the novel features being pointed out in the claims at the end of the specification.

In the drawings:

Figure 1 is an elevation of an apparatus embodying and for carrying out the invention, and Figure 2 is an enlarged sectional elevation of a portion of a processing container shown in Figure 1 and of a means for supplying steam or a mixture of steam and air to the container.

Similar reference numerals throughout the several views indicate the same parts.

The invention comprises a process for preparing milk products as described, in which the liquid, after being standardized, if necessary, to a predetermined degree of acidity, is heated and subjected, in a state of relatively fine sub-division in a partial vacuum, to the purifying action of a current of steam or of a mixture of steam and air, which serves to remove the undesirable flavors and odors and is carried off with the latter by a suitable exhauster means.

In the drawings, there is shown at 5 a container or vacuum pan, preferably constructed of glass lined steel, to stand the pressure differences employed, and to protect the product against the possible injurious effects of exposure to metal surfaces. Means are provided for heating or cooling the liquid contents of the container during the process, having the form, in the present instance, of an enclosing metal jacket 6 with a supply pipe 7 at its top and a discharge pipe 8 at its bottom, for circulating in contact with the container walls, a heating or cooling medium, such as steam, hot or cold water, or brine, as more fully explained hereafter. For the purpose of supplying the liquid to be treated to the container in a state of relatively fine sub-division, affording a large surface of exposure, there is provided a supply pipe 9 shown as entering the container horizontally adjacent its top and carrying within the latter a spray device 10 such as a spray head or rose adapted to discharge the liquid into the container preferably in the form of a multiplicity of jets or spray. Spray device 10 may have various forms of construction well known in the art for the purpose stated and requires no detailed description. Pipe 9 is connected as by means of a pipe 11 with a Pasteurizer 12 of the usual or any suitable variety through which the liquid is forced by means such as a pump 13 from a reservoir 14.

For treating liquid heavily charged with objectionable flavors and odors, it is desirable to circulate the same continuously and repeatedly through the spraying device and container 5, for which purpose there is connected with the bottom of the latter a pipe 15 leading to the intake of a suitable pump 16, the discharge of which is connected by a pipe 17 with the pipe 9. There is thus provided a system for continuously withdrawing liquid from the bottom of the container and discharging the same into the top of the container again in a state of relatively fine sub-division or spray, for the purpose of subjecting all portions of the liquid intensively to repeated treatments.

The means for maintaining a reduced pressure or partial vacuum in container 5 comprises a pipe 18 connected adjacent its top and leading to the suction intake of a suitable exhauster means, such as a pump 19 of the wet vacuum type well known in the art, and adapted to maintain a desired degree of vacuum in the container. It is obvious, however, that the pump 19 may be replaced by other exhauster means such for example as a jet or other known form of condenser.

It has been found that purification of the milk may be accomplished with a high degree of rapidity and thoroughness by spraying the milk or other liquid at a relatively high temperature into a reduced pressure while maintaining a current of steam, or of a mixture of steam and air, in suitable proportions through the container in contact with the liquid. To this end there is located in the container a supply means, such as the rose 20, which is preferably so disposed as to discharge a multiplicity of jets of steam, or of steam mixture, against the level of the liquid collected in the lower portion of the container, as best shown in Figure 2. Rose 20 is carried by a conducting means or pipe 21 projecting exteriorly through the wall of the container and provided with valved branches 22 and 23 adapted for connection, respectively, with suitable sources of supply of steam and air, so that steam alone, or steam mixed with air in any desired proportions, may be supplied by adjustment of the valves in the connections 22 and 23. By this means steam or steam mixture is projected distributively against the surface level of the liquid and thence rises through the upper portion of the container and through the descending milk spray to the exhauster pipe 18 through which the steam and the objectionable odors and flavors are rapidly removed. When air is employed with the steam it becomes thoroughly mixed with and heated by the latter before discharged through the rose 20.

After such treatment of the liquid in container 5 is finished and the vacuum in the container relieved, as hereafter described, the liquid is then rapidly cooled as by means of a cooler 24 of any suitable variety preferably provided with coils for the circulation of cold water, or brine, or both, as condition may require. The cooler is supplied through a pipe 25 having a valve controlled connection with the discharge outlet of pump 16, as for example by connection with pipe 17. The discharge outlet of the cooler is connected by pipe 26 with a receptacle 27 for receiving the liquid and this receptacle has a connection 28 with the vacuum 18 controlled by a valve 29. The junctions of pipes 9 and 17 and 17 and 25 are controlled by suitable valves, as shown, and it is apparent from this construction that the liquid to be treated may be pumped by the means 13, or drawn by the vacuum from the Pasteurizer, into the container, and may then be continuously and repeatedly circulated through the latter by the pump means 16. Also, that the liquid after treatment may be forced by the pump means 16 or by a pressure difference created by drawing the vacuum on receptacle 27, from the container to the cooler 24 and into the receptacle 27.

The vacuum container is preferably equipped adjacent the bottom with an agitator of any known and suitable variety carried on and driven by a shaft 30 operated by connection with a suitable motor 31, as well understood in the art, for agitating the liquid in the container. The latter is also preferably equipped with a sampling spout 32 and with a fitting 33 for supporting in the container the bulb of a suitable thermometer device indicated generally at 34. At 35 in the top of the container is a cock for breaking the vacuum in the latter when desired.

The process carried out in the operation of the above apparatus comprises, in the case of sour milk, cream or the like, first standardizing the same to a predetermined degree of acidity by the addition of lime hydrate, sodium bicarbonate or other neutralizing agents, so that it will withstand all subsequent treatment without curdling in an abnormal manner. In the treatment of some products, however, such as sweet cream, this part of the process may be omitted. The vacuum pump 19 is then started and when the vacuum in container 5, as is shown by a suitable gauge, reaches a degree of 20 inches or higher, the Pasteurizer is put in operation and the liquid passed through the same into the vacuum container at a temperature of approximately 180° to 185° F. Simultaneously a current of steam or of steam mixed with air is supplied through the rose 20 just above the level of the liquid in the container. As the liquid enters the container through the device 10 it is broken up into a state of relatively fine sub-division or spray, with large surface exposure and drops in the form of a shower. While the liquid is thus entering the container, the circulating pump 16 is started which results in the circulation of the liquid from the bottom of the container through the spraying device, so that it is continuously and repeatedly subjected in the form of spray to the action of the steam current from the discharge means 20.

After the entire batch of liquid to be treated has thus been drawn into the container, the recirculating operation is continued under the conditions described as long as the state of the liquid may require. The steam supplied through rose 20 impinges upon the surface of the liquid collected in the lower portion of the container and thence rises through the descending liquid spray to the exhaust pipe 19, so that it comes in intimate contact with the liquid. The steam serves to warm the entire shell of the vacuum pan so that no condensation takes place in the pan and for this reason the apparatus may be operated at practically full capacity from the moment cream is injected into it.

The steam also affords a high percentage of vapor acting effectively as a carrying agency for absorbing and sweeping along with it the objectionable volatile odors and substances and especially those which volatilize at the lower temperatures. Due to the fact that the steam is a relatively lighter gas, it crowds the various vapors to the vacuum offtake and at the same time it holds such vapors in a readily condensible gas which increases the rapidity with which they may be removed from the pan. The rapidity with which the steam and its entrained vapors may be condensed affords also the advantage that a relatively high vacuum may be carried in the containers.

A further advantage in the uses of steam lies in its sterile nature which eliminates the possibility of contamination of the liquid. Under some circumstances of operation it is desirable to supply air also to the container for its oxidizing action and the mixing of steam with such air serves to heat the air before admission to the container so as to preserve the temperature of the latter and furthermore sterilizes the air. Sufficient steam or steam mixture is supplied in this manner to continuously and completely sweep off the volatile substances without, however, interfering materially with the maintenance of a relatively high vacuum in the container.

During this treatment the temperature of the liquid is held at between 140° and 150° F. by circulating the heating medium such as steam or hot water through the container jacket. Such heating of the liquid during subjection in a sub-divided state to the action of the partial vacuum and of the current of steam serves to rapidly and thoroughly release and remove objectionable flavors and odors and this operation is continued until samples of the liquid show that the objectionable matters have been eliminated. In the case, for example, of cream having initially but a slight change of off-flavors, these are removed substantially instantaneously upon discharge into the vacuum container and without recirculation, but in the case of cream strongly impregnated with an off-flavor or odor, a somewhat longer treatment is necessary, although the desired result is completely attained in all cases in a period of a comparatively few minutes. This short duration of treatment avoids all tendencies to produce a mealy consistency in the product or otherwise injure its physical properties and market value.

At the end of the operation, the supply of steam to the container is stopped and the vacuum raised while the liquid is still being circulated by the pump 16. This removes the remainder of the vapors and helps to lower the temperature which latter is further effected by circulating cold water through the container jacket. With the gases thus removed from the container and the temperature lowered to about 130 degrees F. or below, the vacuum in the container is broken and the vacuum drawn out of the receptacle 27. The agitator in the container is then started for the purpose of maintaining the liquid sufficiently agitated to prevent "oiling off" of the butter fat and the liquid is bi-passed to the cooler by the means already described. The latter is preferably operated partly with cold water and partly with brine so that when the liquid reaches receptacle 27, it is near the desired temperature for churning of approximately 50° F. By this means the desired rapid cooling of the product to avoid "oiling off" is readily accomplished. Previous processes for accomplishing the object of the present invention have generally required treatment over such an extensive period of time as to cause products, such as cream, for example, to acquire a disagreeable mealy texture depreciating its market value. The present invention provides such an intensive method of treatment as to greatly reduce the time of the process and thereby remove all danger of such injury to the quality of the product. The process is for the same reason an economical one and its simplicity also adapts it for commercial operations on a large scale. The invention likewise provides a comparatively simple practical and reliable apparatus by means of which the process may be accurately and conveniently controlled and carried out.

I claim as my invention.

1. The process of treating milk for the purpose described comprising subjecting the milk to intimate contact with a supply of steam in a partial vacuum by circulating the milk through a container in which the partial vacuum is produced.

2. The process of treating milk for the purpose described comprising projecting the milk in a state of subdivision through a current of steam in a partial vacuum and subsequently circulating the milk through a cooling apparatus.

3. The process of treating milk for the purpose described comprising heating the milk and causing the same to flow in a state of subdivision through a current of steam in a partial vacuum and subsequently circulating the milk through a cooling apparatus.

4. The process of treating milk for the purpose described comprising continuously circulating a batch of milk through a flow of steam in a partial vacuum to thereby subject all portions of the milk to repeated and intensive treatment.

5. The process of treating milk for the purpose described comprising heating the milk and continuously circulating a batch thereof in a state of subdivision in a partial vacuum through a flow of steam to thereby subject all portions of said batch of milk to repeated and intensive treatment.

6. The process of treating milk for the purpose described comprising heating a batch thereof to a relatively high temperature, continuously and repeatedly projecting the same in a state of relatively fine subdivision into a container, admitting a continuous supply of steam to said container, and continuously exhausting the container above the milk level to maintain a reduced pressure therein.

7. The process of treating milk for the purpose described comprising continuously withdrawing the milk from the bottom of a container and discharging the same into the top thereof in a multiplicity of fine jets, discharging a supply of steam in a multiplicity of fine jets against the level of the milk in the container, and exhausting the container continuously above the milk level to maintain a reduced pressure therein.

8. The process of treating milk for the purpose described comprising projecting the milk in a state of subdivision through a current of mixed steam and air in a partial vacuum and subsequently circulating the milk through a temperature regulating apparatus.

9. The process of treating milk for the purpose described comprising heating a batch of the milk and continuously and repeatedly spraying the same into a partial vacuum through a current of mixed air and steam.

10. The process of treating milk for the purpose described comprising heating a batch of the milk, continuously withdrawing the milk from the bottom of a container and spraying the same into the container at its top, spraying a mixture of air and steam against the level of the milk in the container, and exhausting the container continuously above the milk level to maintain a partial vacuum therein.

ULYSESS G. TODD.